United States Patent Office 2,995,555
Patented Aug. 8, 1961

2,995,555
CHROMATE DERIVATIVES
Milton R. Lauver, Mentor, Ohio, assignor to Diamond Alkali Company, Cleveland, Ohio, a corporation of Delaware
No Drawing. Filed Aug. 4, 1958, Ser. No. 753,116
3 Claims. (Cl. 260—270)

This invention relates to compounds represented by the structure:

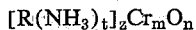

wherein $t$ is a number from 1 to 2, $z$ is a number from 1 to 2, $m$ is a number from 1 to 4, $n$ is 4 when $m$ is 1, 7 when $m$ is 2, 10 when $m$ is 3 and 13 when $m$ is 4, and R is selected from the group consisting of aryl radicals such as phenyl and naphthyl, alkaryl radicals such as tolyl or xylyl, aralkyl radicals such as benzyl and phenethyl radicals, and radicals represented by the structure:

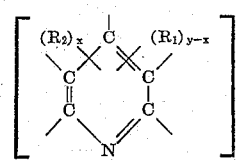

and

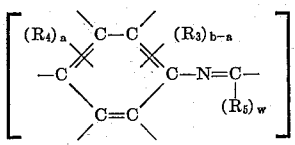

where $R_1$, $R_3$ and $R_5$ are hydrogen, $R_2$ and $R_4$ are alkyl radicals, $x$ and $a$ are numbers from 0 to 5, $w$ is a number from 0 to 1, and $y$ and $b$ are 5, and to the preparation and application of these compounds.

More specifically this invention relates to compounds represented by the structure $[R(NH_3)_t]_zCrO_4$, $$[R(NH_3)_t]_zCr_2O_7$$

$[R(NH_3)_t]_zCr_3O_{10}$ and $[R(NH_3)_t]_zCr_4O_{13}$ wherein R, $t$ and $z$ are as hereinbefore defined.

Specific illustrative compounds falling within the scope of this invention are:

2-pyridinyl ammonium chromate
2-pyridinyl ammonium dichromate
2-pyridinyl ammonium trichromate
2-pyridinyl ammonium tetrachromate
Phenyl guanidinium chromate
Phenyl guanidinium dichromate
Phenyl guanidinium trichromate
Phenyl guanidinium tetrachromate
Anilinium dichromate
Benzyl ammonium dichromate
P-methyl anilinium dichromate Novel compounds of the present invention generally may be prepared by reacting chromic acid ($CrO_3$) with a compound of the structure, $R(NH_2)_t$ or salts thereof, wherein $t$ is a number from 1 to 2, R is selected from the group consisting of aryl radicals, alkaryl radicals, aralkyl radicals and radicals represented by the structure:

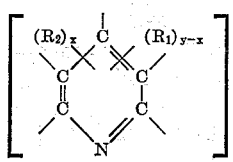

and

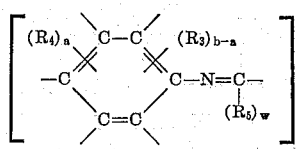

wherein $R_1$, $R_3$ and $R_5$ are hydrogen, $R_2$ and $R_4$ are alkyl radicals, $x$ and $a$ are numbers from 0 to 5, $w$ is a number from 0 to 1, and $y$ and $b$ are 5.

Typically, the reaction is carried out by adding an aqueous solution of the chromic acid ($CrO_3$) to the R—$NH_2$ compound or salt thereof. Stoichiometric amounts of the reactants are used, the higher chromates, i.e., the dichromates, trichromates and tetrachromates, being formed by varying the amount and concentration of the chromic acid ($CrO_3$) used. The reaction is desirably carried out at room temperature, i.e., 20–26° C., this temperature being maintained by the addition of ice or other cooling media to the reaction mixture if necessary, although higher temperatures may be used, depending on the R—$NH_2$ compound which is used.

The novel organic chromium compounds of this invention comprise products which are useful as chemical intermediates, and exhibit a high degree of biological activity. More specifically, these compounds are active insecticides, such as for the control of beetles, aphids and mites; fungicides, such as for the control of blight fungi; and bactericides, such as for the control of micro-organism growth.

While compounds of this invention may be employed in a variety of applications, biologically active or otherwise, when employed as biologically active materials, it will be understood, of course, that such compounds may be utilized in diverse formulations, both liquid and solid, including finely-divided powders and granular materials, as well as liquids, such as solutions, concentrates, emulsifiable concentrates, slurries and the like, depending upon the application intended and the formulation media desired.

These compounds may be used alone or in combination with other known biologically active materials, such as chlorinated hydrocarbons, insecticides, foliage and soil fungicides, pre- and post-emergent herbicides and the like.

Thus, it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina-silica materials, liquids, solvents, diluents or the like, including water and various organic liquids, such as benzene, toluene, chlorinated benzene, acetone, cyclohexanone, xylene, carbon disulfide and various mixtures thereof.

When liquid formulations are employed, or dry materials prepared which are to be used in liquid form, it is desirable in certain instances additionally to employ a wetting, emulsifying or dispersing agent to facilitate the use of the formulation, e.g., Triton X-155 (alkyl aryl polyether alcohol, U.S. Patent 2,504,064).

The term "carrier" as employed in the specification and claims is intended to refer broadly to materials constituting a major proportion of a biologically active or other formulation, and hence includes finely-divided materials, both liquids and solids, as aforementioned, conveniently used in such applications.

In order that those skilled in the art may more completely understand the present invention and the preferred methods by which the same may be carried into effect, the following specific examples are offered.

Example I 48.2 g. of phenyl guanidinium carbonate are suspended in 2000 ml. of water. 26 g. of chromic acid ($CrO_3$) in 230 ml. of water are added to the phenyl guanidine carbonate suspension. The mixture is heated and then allowed to cool. Upon cooling, orange crystals are formed which are filtered out of the mixture. The crystals are analyzed and found to have the composition represented by the following emperical formula: $C_7H_{11}CrN_3O_4$.

Example II

Spore germination tests on glass slides are conducted via the test tube dilution method adopted from the procedure recommended by the American Phytopathological Society's committee on standardization of fungicidal tests. In this procedure, the product of Example I in aqueous formulations at concentrations of 1000, 100, 10 and 1.0 p.p.m. is tested for its ability to inhibit germination of spores for 7 to 10-day-old cultures of *Alternaria oleracea* and *Monilinia fructicola*. These concentrations refer to initial concentrations before diluting 4 volumes with 1 volume of spore stimulant and spore suspension. Germination records are taken after 20 hours of incubation at 22° C. by counting 100 spores. Results indicate that concentrations of 10 p.p.m. and less than 1 p.p.m. afford disease control for the *A. oleracea* and *M. fructicola*, respectively.

Example III

A tomato foliage disease test is conducted measuring the ability of the test compound of Example I to protect tomato foliage against infection by the early blight fungus *Alternaria solani*. Tomato plants 5 to 7 inches high of the variety Bonny Best are employed. The plants are sprayed with 100 ml. of test formulation at 2000 p.p.m. and 400 p.p.m. product of Example I in combination with 5% acetone—0.01% Triton X-155—and the balance water at 40 lbs. air pressure while being rotated on a turntable in a spray chamber. After the spray deposit is dry, the treated plants and comparable untreated controls are sprayed with a sport suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants shows that a concentration of 2000 p.p.m. produces a 95% mortality of the fungus.

Example IV

Herbicidal activity is evaluated by using tomato plants, variety Bonny Best, 4 to 7 inches tall; corn, variety Early Golden Orange Dent, 4 to 6 inches tall; and bean, variety Tendergreen. Each of the plants is treated by pouring a test formulation containing 250 mg. of the product of Example I (5% acetone—0.01% Triton X-155—balance water) on the soil of the 4 inch pots containing the plants. After 10 days phytotoxicity is rated on a scale of 0 for no injury to 11 for plant kill. Using this procedure, the product of Example I receives a rating of 11 for tomato, 11 for corn and 11 for bean.

Example V

To evaluate bactericidal activity the test chemical is mixed with distilled water, containing 5% acetone and 0.01% Triton X-155, at a concentration of 1000 p.p.m. Two ml. of the test formulation are put in each of four test tubes. To each test tube is added 0.5 ml. of culture broth of a different test organism. The following organisms are used: *Erwenia amylovora, Xanthomonas phaseoli, Staphylococcus aureus* and *Escherichia coli*. The first two organisms are plant pathogens. The tubes are then incubated for 24 hours at 37° C. Transfers are then made to sterile broth with a standard 4 mm. loop and incubated for 48 hours at 37° C. when growth is rated as follows: A=no growth, B=slight, C=moderate and D=heavy growth. Using this procedure, the product of Example I receives a rating of C, C, D and D, respectively, against each of the above organisms.

Example VI 94 g. of 2-amino pyridine are dissolved in a 100 ml. of water. To this solution 50 g. of chromic acid ($CrO_3$) in 100 ml. of water are added. The mixture is evaporated under vacuum until a saturated solution at 20–26° C. is obtained. Sufficient acetone is added to obtain an orange precipitate, which precipitate is filtered out of the solution and dried at 50° C. Analysis of this precipitate shows that it has an emperical formula of $C_{10}H_{14}Cr_2N_4O_7$.

Example VII

Employing the fungicide spore germination evaluation given in Example II, incorporating the product of Example VI, results indicate that concentrations of 10 p.p.m. and less than 1 p.p.m. afford disease control for the *A. oleracea* and *M. fructicola*, respectively.

Example VIII

A tomato foliage disease test is conducted measuring the ability of the product of Example VI to protect tomato foliage against infection by the early blight fungus *Alternaria solani*. Tomato plants 5 to 7 inches high of the variety Bonny Best are employed. The plants are sprayed with 100 ml. of test formulation at 250 p.p.m. product of Example VI in combination with 5% acetone—0.01% Triton X-155—and the balance water at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants shows that when using a concentration of 250 p.p.m. 95% mortality is obtained.

Example IX

Employing the bactericide evaluation procedure given in Example V, the product of Example VI receives ratings of C, B, B and A for each of the above organisms, respectively.

It is to be understood that although the invention has been described with specific reference to particular embodiments thereof, it is not to be so limited, since changes and alterations therein may be made which are within the full intended scope of this invention as defined by the appended claims.

What is claimed is:
1. Compounds represented by the structure:

$$[R(NH_3)_t]_zCr_mO_{3m+1}$$

wherein $t$ is a number from 1 to 2, $z$ is a number from 1 to 2, $m$ is a number from 1 to 4, and R is a radical selected from the group consisting of phenyl, methyl phenyl, benzyl,

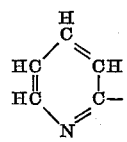

and

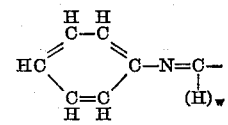

wherein $w$ is a number from 0 to 1.

2. 2-pyridinyl ammonium dichromate.
3. Phenyl guanidinium chromate.

References Cited in the file of this patent

UNITED STATES PATENTS

| | | |
|---|---|---|
| 2,734,815 | Mowry et al. | Feb. 14, 1956 |
| 2,762,822 | Vagenius | Sept. 11, 1956 |
| 2,798,069 | Schaeffer | July 2, 1957 |
| 2,802,770 | Monroe et al. | Aug. 13, 1957 |
| 2,809,146 | Osborn et al. | Oct. 8, 1957 |
| 2,838,389 | Yoder | June 10, 1958 |

OTHER REFERENCES

Chuck-Chung Ma, J. American Chemical Society, pp. 1333–1335, vol. 73 (1951).